United States Patent [19]

Isozaki et al.

[11] 4,375,070
[45] Feb. 22, 1983

[54] MAGNETIC HEAD SOFT LOADING AND UNLOADING DEVICE

[75] Inventors: Shin Isozaki; Masaru Sasaki; Kanji Sakurai, all of Kamakura, Japan

[73] Assignee: Mitsubishi Denki Kabushiki Kaisha, Tokyo, Japan

[21] Appl. No.: 192,596

[22] Filed: Sep. 30, 1980

[30] Foreign Application Priority Data

Oct. 1, 1979 [JP] Japan .............................. 54/126621

[51] Int. Cl.³ ........................ G11B 21/12; G11B 5/54
[52] U.S. Cl. ...................................... 360/75; 360/105
[58] Field of Search ................................ 360/105, 75

[56] References Cited

U.S. PATENT DOCUMENTS 3,668,666  6/1972  Heffernan et al. .................. 360/75
4,202,020  5/1980  Lovgren et al. ..................... 360/75
4,218,714  8/1980  Isozaki et al. ....................... 360/105

OTHER PUBLICATIONS

3rd USA-Japan Computer Conference Proceedings, M. Kakuda et al., 1978, pp. 355-359, Oct. 10-12, San Francisco, CA.
IBM Technical Disclosure Bulletin-vol. 18, No. 7, Dec. 1975, N.Y. (US) E. L. Bailey et al.: Read/Write Head Load-Unload Device-pp. 2246-2247.

DE-A 2 904 630 (Hitachi Ltd.).
US-A 4,241,366.
DE-B 2 608 144 (Siemens AG).
DE-A 851 841.
Patent Abstracts of Japan-vol. 3, No. 82, Jul. 14, 1979, pp. 90E 123 and JP-A 54 60 908 (Mitsubishi Denki KK) (May 16, 1979).
FR-A 2 260 910 (Philips).

Primary Examiner—Robert S. Tupper
Attorney, Agent, or Firm—Wenderoth, Lind & Ponack

[57] ABSTRACT

The invention is related to a magnetic head loading and unloading device and includes an electromagnet having a spring loaded armature operative to load a double-sided flexible magnetic recording disc having two associated opposite magnetic heads and resiliently unloading the magnetic heads from the recording disc. A permanent magnet is connected to the armature and forms a speed sensor with an associated solenoid to sense the loading or an unloading speed of the magnetic heads. The solenoid includes an output connected to a negative input of a differential amplifier which includes a positive input comprising a command loading signal. The amplifier output is connected to a winding for exciting the electromagnet through an emitter grounded transistor.

11 Claims, 12 Drawing Figures

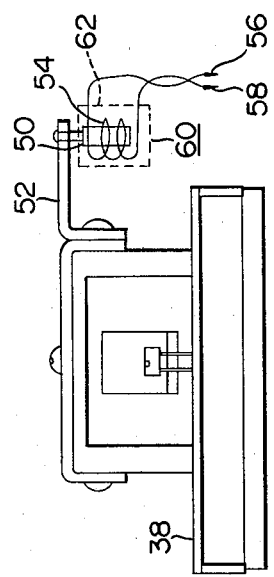
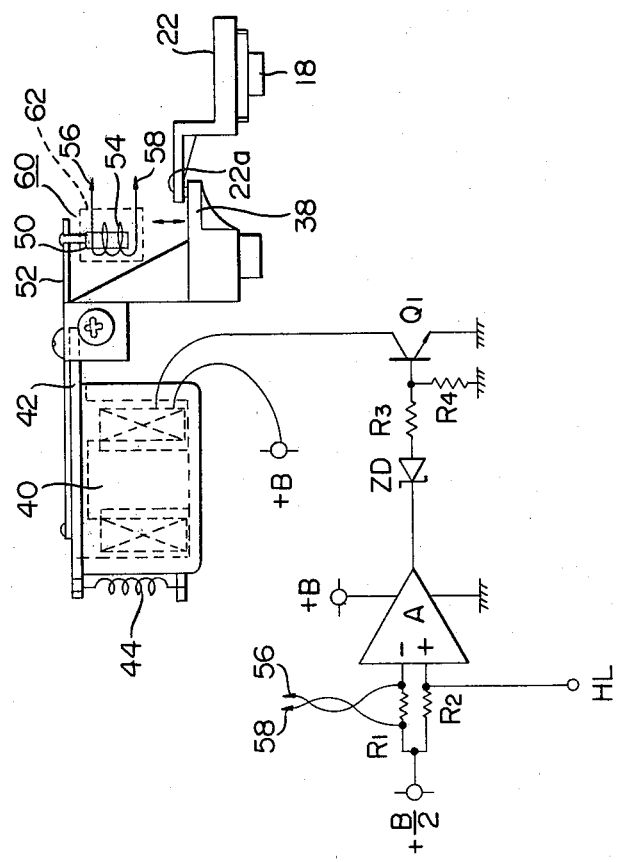
FIG. 3B
FIG. 3A

MAGNETIC HEAD SOFT LOADING AND UNLOADING DEVICE

BACKGROUND OF THE INVENTION

This invention is related to improvements in a double-sided flexible disc drive apparatus for writing and reading digital information, associated with an electronic computer, into and out of both surfaces of a flexible magnetic recording disc medium. Particularly, the invention is related to a device for softly loading a flexible magnetic recording disc with a magnetic head or heads and softly unloading the magnetic head or heads from the flexible magnetic recording disc medium.

Conventional double-sided flexible disc drive apparatus have comprised an interchangeable flexible magnetic recording disc medium rotatably disposed therein, a pair of opposite magnetic heads held by a pair of upper and lower spring loaded arms respectively and operative to place the magnetic recording disc therebetween, a movable carriage for pivotally carrying the upper and lower arms, and a lifting arm connected to the upper arm to raise and lower simultaneously the upper and lower arms and the opposite magnetic heads toward and away from the magnetic recording disc medium.

In an inoperative state or on standby, the lifting arm is raised by a bail plate operatively coupled to an armature of an electromagnet to prevent the magnetic heads from contacting the magnetic recording disc medium. The armature is arranged to ascend by a return spring disposed on the electromagnet when the latter is not energized. In operation, however, the electromagnet is energized causing the bail plate to approach the magnetic recording disc medium thereby releasing the lifting arm from the bail plate. At this time, the upper and lower arms approach the record disc by means of the biasing of force springs coupled thereto until the magnetic heads contact the respective opposite surfaces of the recording disc medium. At that time the magnetic heads have tended to strike against the opposite recording surfaces of the disc medium causing damage to the latter recording medium surface.

It is already known that such damage to the magnetic recording surface can be alleviated by controlling the speed at which each of the magnetic heads contacts and strikes the recording disc medium, to a suitable magnitude.

One known type of means for alleviating damage to the magnetic recording surfaces as described above is a piston slidably fitted into an air cylinder disposed within a mounting casing to form a dash-pot or an air damper. The mounting casing has been fixedly secured to the movable carriage and the piston includes a piston rod connected to the upper arm adjacent to the associated magnetic head. When the upper arm descends toward the magnetic recording disc medium due to the energizing of the electromagnet, the air damper provides a braking force so as to control the descending speed of the upper arm resulting in the minimization of damages to the magnetic recording disc medium. However, this air damper has increased the mass of the carriage which must be rendered as light as possible.

Accordingly, it is an object of the present invention to provide a new and improved magnetic disc soft loading and unloading device including an effective means for preventing a magnetic recording medium involved from damaging while eliminating the disadvantages of the prior art practice and to provide a device suitable for use with a double-sided flexible disc drive apparatus.

It is another object of the present invention to provide a new and improved magnetic head soft-loading and unloading device of the type described in the preceding paragraph including a simplified mechanical portion and an electronic circuit forming a negative feedback system which can control the speed at which the magnetic recording medium is loaded with an associated magnetic head or at which the magnetic head is unloaded from the magnetic recording medium to thereby decrease the damage to the magnetic recording medium.

SUMMARY OF THE INVENTION

The present invention provides a magnetic head soft loading and unloading device which includes an interchangeable magnetic recording medium, a carriage movable along the magnetic recording medium and a pair of magnetic heads disposed on the carriage, at least one of the magnetic heads being disposed on a turnable arm, the arm moving the magnetic head toward the magnetic recording medium when the magnetic recording medium is loaded with the magnetic head, maintaining the magnetic head in the loading state, moving the magnetic head away from the magnetic recording medium when the magnetic head is unloaded from the magnetic record medium, maintaining the magnetic head in the unloaded state. The device also includes driving means, including an electromagnet and a bail plate, for moving the arm by means of the action of the electromagnet when the magnetic recording medium is loaded with the magnetic head and when the magnetic head is unloaded from the magnetic recording medium. The device further includes a speed sensor for sensing a speed of movement of the arm, an exciting winding disposed around the electromagnet to form the driving means with the electromagnet, and a driving circuit for exciting the winding which receives a signal for the sensed speed from the speed sensor and controls the current flowing through the exciting winding to thereby control the speed at which the energized electromagnet moves the arm and therefore the speed at which the magnetic head is moved toward and away from the magnetic recording medium.

Preferably, the speed sensor may include a permanent magnet disposed on a movable portion of the electromagnet and a solenoid electromagnetically coupled to the permanent magnet to generate an electromotive force dependent upon a speed of movement of the movable portion.

Advantageously, the driving circuit for the exciting winding may include a differential amplifier or a comparison circuit having a pair of inputs with one of the input being applied with the sensed speed signal from the speed sensor and the other input being applied with a loading or an unloading signal for the magnetic head so that the differential amplifier or comparison circuit produces a signal which represents the difference between those two signals so as to change the current flowing through the exciting winding in accordance with the output signal of the amplifier.

BRIEF DESCRIPTION OF THE DRAWINGS

The present invention will become more readily apparent from the following detailed description taken in conjunction with the accompanying drawings in which:

FIG. 3A is a front view of one embodiment according to the head loading device of the present invention used with a double-sided flexible disc drive apparatus and a wiring diagram of an electric circuit forming one part of the head loading device;

FIG. 3B is a side elevational view of the arrangement shown in FIG. 3A;

Throughout the Figures like reference numerals designate identical or corresponding components.

DESCRIPTION OF THE PREFERRED EMBODIMENTS

Figure 1A:
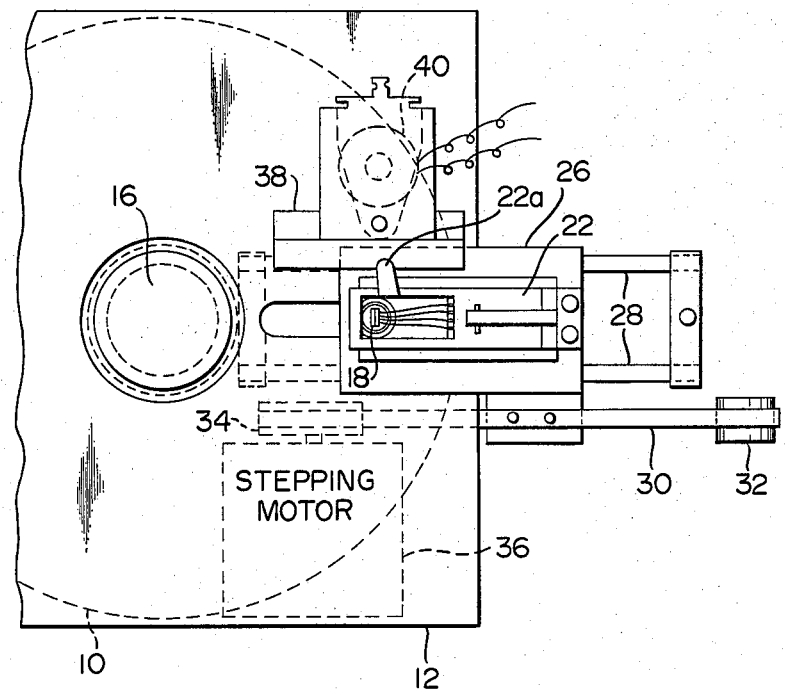
FIG. 1A is a fragmental front view of the essential part of a conventional double-sided flexible disc drive apparatus.
Figure 1B:
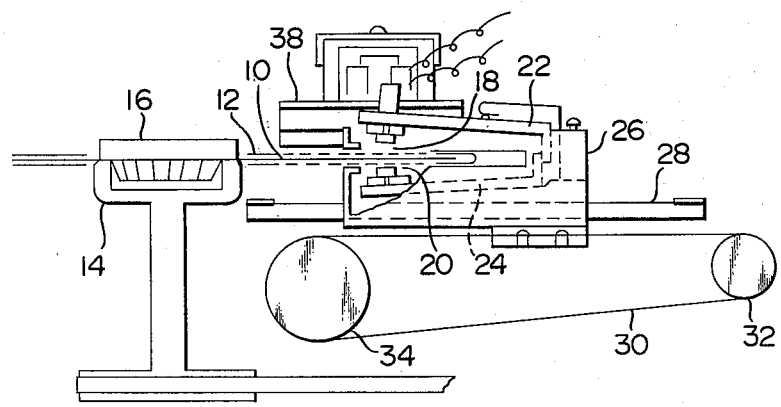
FIG. 1B is a side elevational view of the apparatus shown in FIG. 1A with parts broken away for clarity.

Referring now to FIGS. 1A and 1B of the drawings, there is illustrated a conventional double-sided flexible disc drive apparatus. The arrangement apparatus illustrated comprises a magnetic recording medium 10 in the form of flexible disc which is housed within a jacket 12 and is detachably secured on the central portion to a spindle 14 through a collet 16 fitted thereinto so that the flexible disc-shaped recording medium 10 is rotatable at a predetermined speed of rotation while the jacket 12 is maintained relatively stationary. The recording medium 10 along with the jacket 12 can be removed from the spindle 14 and the collet 16 for exchange purposes. The assembly of the recording medium 10 and the jacket 12 is generally called a "flexible disc cartridge" or commercially a "floppy disk" or "diskette".

A magnetic head carriage 26 includes a pair of upper and lower magnetic recording and reproducing heads 18 and 20 softly secured to free end portions of a pair of upper and lower spring loaded arms 22 and 24 respectively such that the heads are opposite one another and are respectively located on opposite sides of the recording medium 10. The upper and lower magnetic heads 18 and 20, the upper and lower arms 22 and 24 are respectively connected together through levers located near pivots on the carriage 26 such that heads and arms move simultaneously. The lever of the lower arm 24 is pushed by the lever of the upper arm 22. A lifting arm 22a is fixedly secured to the upper arm 22 adjacent to the upper magnetic head 18 and can be lifted so as to move the upper arm 22 and therefore the upper magnetic head 18 away from the recording medium 10 in a upward direction as viewed in FIG. 1B and simultaneously move the lower arm 24 and therefore the lower magnetic head 20 away from the medium 10 in a downward direction, as viewed in FIG. 1B, because the lever of the upper arm 22 pushes against the lever of the lower arm 24. The lifting arm 22a at its lifted position can subsequently be depressed to simultaneously move the upper and lower arms 22 and 24 and therefore the two magnetic heads 18 and 22 toward the magnetic recording medium 10.

Also, there are known double-sided flexible disc drive apparatus different from that shown in FIGS. 1A and 1B only in that one of the magnetic heads, for example, the lower magnetic head 20 is fixedly secured to the carriage 26 with the lower arm 24 omitted.

In order to position each of the upper and lower heads 18 and 20 on those tracks located on the opposite recording surface of the magnetic recording medium 10 into which information is to be recorded or from which recorded information is to be read out, the carriage 26 is arranged to be slidably threaded with a pair of guide bars 28 disposed in a plane substantially parallel to the plane of disc medium 10 and extending on opposite sides of, and parallel to, a diameter of the recording disc medium 10 and interconnected at both ends by cross members. The carriage 26 is provided on one of its longitudinal edges with a protruberance which is suitably fixed to an endless steel belt 30 spanned between an idler roller 32 and a capstan 34 connected to a rotary shaft of a stepping motor 36. Therefore, the stepping motor 36 can be driven to move the upper and lower magnetic heads 18 and 20 carried by the carriage 26 toward or away from the center of the recording disc medium 10 through the capstan 34, the idler roller 32 and the endless belt 30, until the motor 36 is stopped upon the heads 18 and 20 reaching the desired recording track positions.

During the writing or reading operation, the magnetic heads 18 and 20 are in contact with the recording medium 10. However when the apparatus is in an inoperative state or on standby, the magnetic heads 18 and 20 are maintained out of contact with the recording medium 10 in order to prevent the recording medium 10 from being worn by the magnetic heads 18 and 20. To this end, a bail plate 38 is positioned so as to lift the lifting arm 22a and thereby enabling to maintain the magnetic heads 18 and 20 to be spaced from the recording medium 10. The bail plate 38 is arranged to ascend by means of the biasing force of a return spring operatively coupled to an armature of an electromagnet which will be described hereinafter.

In operation, a head loading electromagnet 40 is energized which causes the bail plate 38 connected to its spring loaded movable armature 42 to approach the recording medium 10. This permits the upper and lower arms 22 and 24 to approach the recording medium 10 by means of overcoming the spring forces thereof until the arms 22 and 24 abut the frame of the carriage 26 and the magnetic heads 18 and 20 contact the recording medium 10.

Since the magnetic heads 18 and 20 are formed from hard materials such as a ferrite, a ceramic material or the like, these heads tend to damage the recording surfaces of the disc medium 10 upon contact. This is because the momentum of the two magnetic heads 18 and 20 causes them to strike the recording medium 10 which is positioned between them.

Conventional double-sided flexible disc apparatus have, in many case, been susceptible to the problem as described above, but it is known that damage to flexible disc-shaped magnetic recording media can be alleviated by controlling the speed at which each of the magnetic heads 18 or 20 contacts and strikes an associated recording medium 10 to one of suitable magnitude.

One type of mechanical means for alleviating the damage to the record medium as described above is disclosed and claimed in U.S. Pat. No. 4,218,714 entitled "Double Side Type Flexible Disc Drive Apparatus" issued on Aug. 19, 1980 to S. Isozaki et al. and assigned to the same assignee as the present application.

Figure 2A:
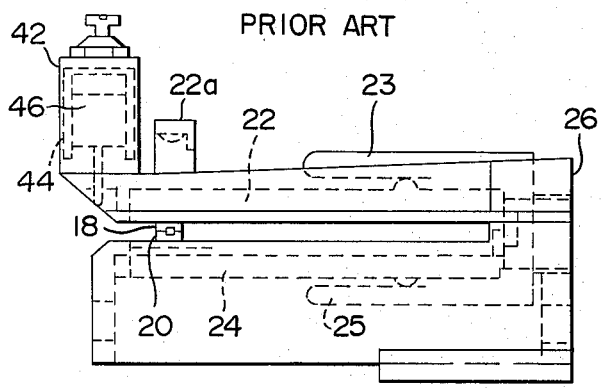
FIG. 2A is a side elevational view of a modified form of the magnetic head carriage shown in FIGS. 1A and 1B and mechanical structure connected thereto for preventing a magnetic recording medium involved from becoming damaged upon loading the recording medium with the magnetic heads and unloading the magnetic heads from the recording medium.
Figure 2C:
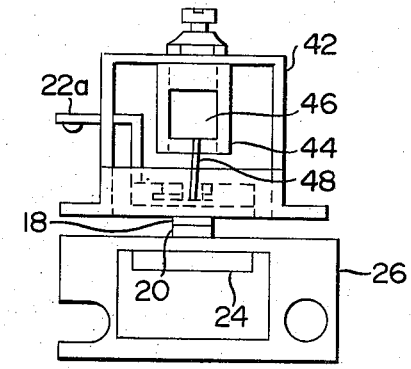
FIG. 2C is a front view of the arrangement shown in FIGS. 2A and 2B.
Figure 2B:
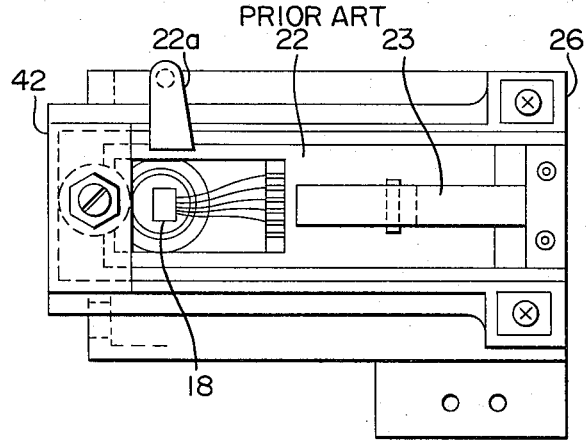
FIG. 2B is a plan view of the arrangement shown in FIG. 2A.

FIGS. 2A, 2B and 2C show, by way of example, mechanical means for minimizing the damage to a disc-shaped recording medium by disposing an air damper on the movable carriage 26. The arrangement illustrated is similar to that disclosed in U.S. Pat. No. 4,218,714. In the arrangement illustrated, the components other than the air damper are substantially identical to those shown in FIGS. 1A and 1B. It is noted that in FIGS. 2A, 2B and 2C, the disc-shaped recording medium 10 and its jacket 12 are omitted and the magnetic heads 18 and 20 are shown as contacting each other in an aligned relationship.

In the arrangement, the air damper is disposed in a mounting casing 42 which is fixedly secured to the upper surface of the carriage 26 at the end adjacent to the upper magnetic heads 18. Disposed within the mounting casing 42 is an air cylinder 44 into which a piston 46 is slidably fitted. The piston 46 includes a piston rod 48 having an end connected to the adjacent end of the upper arm 22.

In operation, the loading electromagnet 40 (not shown) is energized to lower the bail plate 38 (not shown) as in the arrangement of FIG. 1. This causes the lifting arm 22a riding on the bail plate 38 and the upper arm 22 connected to the lifting arm 22a to descend toward the recording medium 10 (not shown) by means of the pushing biasing force exhibited by a spring 23 disposed on the upper arm 22. At this time, the piston 46 connected to the upper arm 22 generates a braking force so as to control the speed at which the upper arm 22 and therefore the magnetic head 18 are moved toward the recording medium 10. Simultaneously, the lower arm 24 with the magnetic head 20 is moved toward the recording medium 10 at a controlled speed. Accordingly, the damage to the recording medium 10 is minimal when the magnetic heads 18 and 20 contact the same.

Since the movable carriage 26 is provided with the mounting casing 42 in which the air cylinder 44 and the piston 46 are disposed, these added components increase the mass although the carriage 26 is required to be as light as possible. Also, the mounting casing 42 may have substantial play between it and the adjacent components. This has resulted in an increased level of audible noise and other disadvantages during the positioning operation performed by the positioning carriage 26.

Mounting the abovementioned air damper to the bail plate 38 can avoid the aforementioned disadvantages due to the positioning moement of the carriage 26. However, the descent of the bail plate 38 is subjected to a high force because the bail plate 38 is directly pulled by means of a electromagnetic force provided by the electromagnet 40. In order to control the descending speed by an air damper mounted to the bail plate such as described above, an impractically large air damper is required. Further, the substitution of an oil damper for the air damper has resulted in the apprehension that a leakage of the oil will occur.

In order to eliminate the disadvantages of the prior art as described above, the present invention provides a speed control device for controlling the speed at which a flexible disc-shaped magnetic recording medium is loaded with an associated magnetic head and the speed at which the magnetic head is unloaded from the magnetic recording medium in a double-sided flexible disc drive apparatus which device is characterized by the utilization of an electronic control circuit.

Referring now to FIGS. 3A and 3B, there is illustrated one embodiment according to the head loading and unloading device of the present invention. It is assumed for purposes of illustration that the arrangement illustrated is operatively coupled to that portion of a double-sided flexible disc drive apparatus identical to the arrangement shown in FIGS. 1A and 1B. The embodiment illustrated comprises the upper magnetic head 18, the upper arm 22 with the lifting arm 22a and the bail plate 38 identical to those shown in FIGS. 1A and 1B, and the embodiment of the present invention is disposed on the bail plate 38.

A permanent magnet 50 is fixed to the armature 42 of the electromagnet 40 which is connected to the bail plate 38 as shown best in FIG. 3A and is arranged to ascend and descend respectively in response to the upward and downward movement of the bail plate 38 due to the energization and deenergization of the loading electromagnet 40. The armature 42 is arranged to be lifted up by means of the biasing force of the return spring 44 which is disposed between one end thereof and the electromagnet 40. A solenoid 54 is electromagnetically coupled to the permanent magnet 50 and includes a pair of output leads 56 and 58. The solenoid 54 is wound around an iron core which includes a pole piece disposed such that a suitable gap is formed between the same and the permanent magnet 50 in order to render a higher induced electromotive force.

When the permanent magnet 50 is moved upwardly or downwardly, the solenoid 54 electromagnetically induces an electromotive force thereacross the magnitude of which is proportional to a speed of upward or downward movement of the permanent magnet 50. Therefore, the permanent magnet 50 and the solenoid 54 comprise a speed sensor for sensing the speed at which the bail plate 38 is moved upwardly or downwardly, the sensor being is generally designated by the reference numeral 60.

If the speed sensor 60 picks up a leakage from the magnetic field of the energized electromagnet 40, the sensor may be enclosed with a magnetic shield shown as a dotted block 62 in FIGS. 3A and 3B.

The pair of output leads 56 and 58 from the solenoid 54 are respectively connected to opposite ends of a resistor $R_1$ which is connected between a positive terminal $+B/2$ and a negative input $(-)$ to a differential amplifier A. The differential amplifier A includes a positive input $(+)$ which is connected to the positive terminal $+B/2$ through a resistor $R_2$ and to a command head loading signal HL. The differential amplfiifer A is shown in FIG. 3A as being connected to a single DC power source represented by a positive terminal $+B$ and to ground.

Further, the differential amplifier A is connected at its output to a cathode electrode of a Zener diode ZD having an anode electrode connected via a resistor $R_3$ to a base electrode of an emitter grounded NPN transistor $Q_1$ for driving the electromagnet 40 with a base resistor $R_4$ connected between the base electrode and ground. The transistor $Q_1$ includes a collector electrode connected to one end of an exciting winding for the electromagnet 40. The exciting winding is connected at its other end to a positive terminal $+B$.

In operation the differential amplifier A compares a sensed speed signal from the speed sensor 60 with the command loading signal HL and amplifies the difference between the signals. The amplified output signal from the differential amplifier A flows to the transistor $Q_1$ as a base current. Thus, the differential amplifier A acts as a comparison circuit.

Immediately after the command loading signal has becomes "HIGH", the solenoid 54 produces no output because the bail plate 38 is stationary. Therefore the transistor $Q_1$ has flowing therethrough a base current with a magnitude sufficient to energize the electromagnet 40 to 100% of its potential.

When the bail plate 38 begins to move downwardly, the solenoid 54 generates an output and the base current through the transistor $Q_1$ decreases. Under these circumstances, the speed of movement of the bail plate 38 reaches a certain magnitude whereupon the current through the transistor $Q_1$ decreases so that the electromagnet 40 is only permitted to be energized to an intermediate level between 0% and 100% of its potential.

From the foregoing it is seen that the head loading speed is automatically controlled so as to approach a constant magnitude determined by the speed of movement of the bail plate 38. The speed, thus controlled, is determined by the sensitivity of the speed sensor 60, the voltage magnitude of the command loading signal, the sensitivity of the differential amplifier A, the current amplification factor of the transistor $Q_1$, the efficiency of the loading electromagnet 40 etc. By selecting properly these parameters, the head loading speed can be controlled to a suitable magnitude.

Also some of the parameters, for example, the amplification of the differential amplifier A, may be variable so as to render the head loading speed variable.

The purpose of the Zener diode ZD is to permit the base current through the transistor $Q_1$ to be sufficiently controlled to a null magnitude. This is because in the arrangement shown in FIG. 3A and 3B, the differential amplifier A is operated with the single DC power source as described above.

If desired, the comparison of the output signal from the speed sensor 60 with the command loading signal may be effected on the output side of the amplifier A. In that event, the differential amplifier A is exclusively used to amplify the output signal from the speed sensor 60 to a high signal level which is easily handled.

From the foregoing it is seen that the resulting head loading speed is relatively slow and approximately constant when the magnetic recording medium is loaded with the magnetic heads. The arrangement shown in FIGS. 3A and 3B can also control the unloading speed to be approximately constant and from being too high. If the unloading speed or the speed of lift of the bail plate is too high then problems occur in that a vibration takes place and the noise becomes high as the bail reaches the highest lifted position.

It will readily be understood that, when the magnetic heads are unloaded from the magnetic recording medium, the solenoid 54 induces an electromotive force of a polarity determined by the direction of movement of the permanent magnet 50 and reversed from that polarity developed when the magnetic recording medium is loaded with the magnetic heads. Accordingly, a "LOW" signal is added to the head loading signal HL resulting in cancellation of the added "LOW" signal. In other words, the resulting polarity is reversed from that developed during the loading of the magnetic heads, and the transistor $Q_1$ proceeds slowly towards cutoff. As a result, a head loading system including the bail plate 38, the permanent magnet 50, the solenoid 54, the amplifier circuit A-$Q_1$ and the head loading electromagnet 40 performs the head unloading operation which is automatically controlled so as to lift the bail plate 38 slowly and at a predetermined constant speed.

In the circuit shown in FIG. 3A, the speed of loading of the magnetic heads is dependent upon the amplification of the amplifier A and the current amplification factor of the transistor $Q_1$. This means that it may be necessary to adjust separately the resulting circuits in accordance with any changes in amplification of the amplifier A and the current amplification factor of the transistor Q. Also there is a possibility that the circuit characteristics will be varied due to a change in temperature and/or a secular change or long term drifts.

Figure 4B:
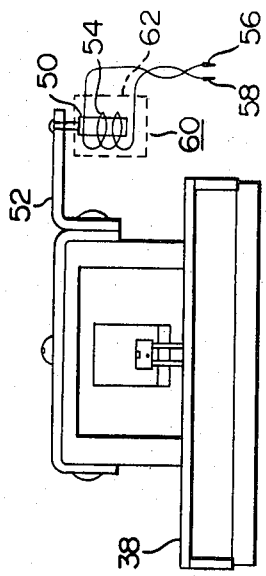
FIG. 4B is a side elevational view of the arrangement shown in FIG. 4A.
Figure 4A:
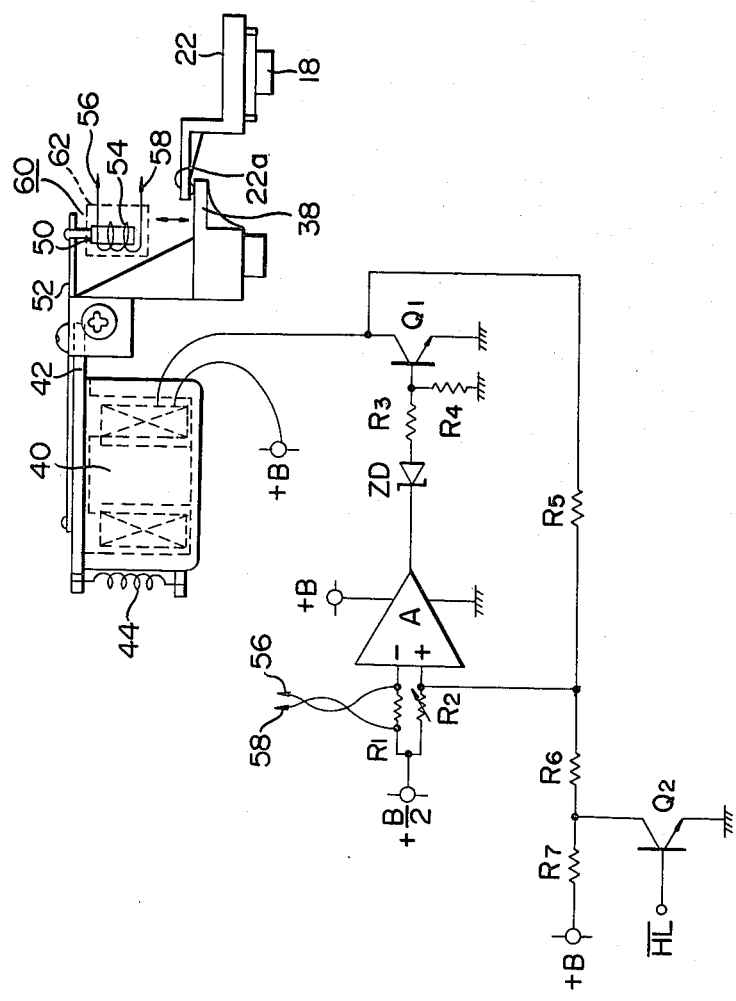
FIG. 4A is a view similar to FIG. 3A but illustrating a modified embodiment of the present invention with an associated circuit.

In order to stabilize the circuit shown in FIG. 3A in for practical use and reduce the influence due to change in parameters thereof, the circuit can be modified into a circuit configuration as illustrated in FIG. 4A. The arrangement illustrated in FIGS. 4A and 4B is identical to that shown in FIGS. 3A and 3B except for the circuit for energizing the electromagnet 40. As shown in FIG. 4A, the circuit includes a negative feedback resistor $R_5$ connected across the positive input (+) of the amplifier A and the collector electrode of the transistor $Q_1$ to provide a negative feedback circuit for the head loading in order to stabilize the system as a whole. In this arrangement it is difficult to apply to the amplifier A the head loading signal with its level remaining unchanged. Therefore, the positive input (+) of the amplifier A is connected to a collector electrode of an emitter grounded transistor $Q_2$ through a resistor $R_6$. The transistor $Q_2$ has the collector electrode connected to a positive DC power source $+B$ through a resistor $R_7$ and a base electrode connected to a terminal to which a complement of a head loading signal, HLT is applied.

In other respects the arrangement illustrated in FIGS. 4A and 4B is identical to that shown in FIGS. 3A and 3B.

Upon loading the head, the transistor $Q_2$ is turned off while the negative feedback circuit is operated to apply a high level positive signal to the positive input (+) of the amplifier A through the resistors $R_7$ and $R_6$ from the DC power source $+B$. The positive bias is in a direction of loading of the magnetic heads. Upon head unloading, however, the transistor $Q_2$ is turned on while the negative feedback circuit is operated to apply a low level signal in with a ground polarity to the positive input (+) of the amplifier through the resistor $R_5$. At that time the low level signal is in a direction of unloading of the magnetic heads.

In the arrangement shown in FIGS. 4A and 4B, the head loading signal is reliably operated simply by turning the transistor $Q_2$ off upon the head loading or turning the transistor $Q_2$ on upon the head unloading and the speed of loading or unloading of the magnetic head is automatically controlled to a substantially constant magnitude as described above in conjunction with FIGS. 3A and 3B.

It is to be noted that the resistor $R_5$ is required have a high magnitude of resistance in order to minimize the current flowing through the electromagnet 40 upon turning it off.

If desired, the differential amplifier may be replaced by a combination of an amplifier for amplifying only the output from the sensor solenoid with the opposite polarity and a comparison circuit formed, for example, of a resistance network.

Figure 5B:
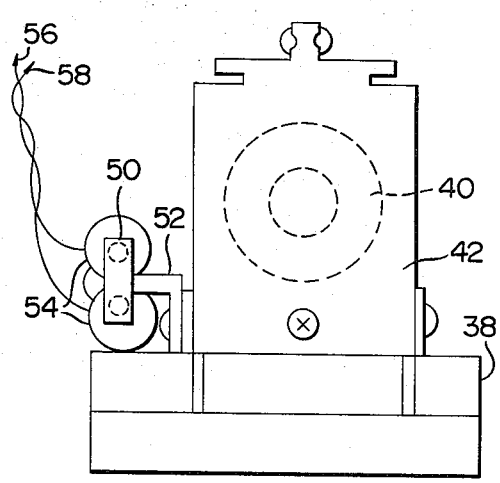
FIG. 5B is a plan view of the arrangement shown in FIG. 5A.
Figure 5A:
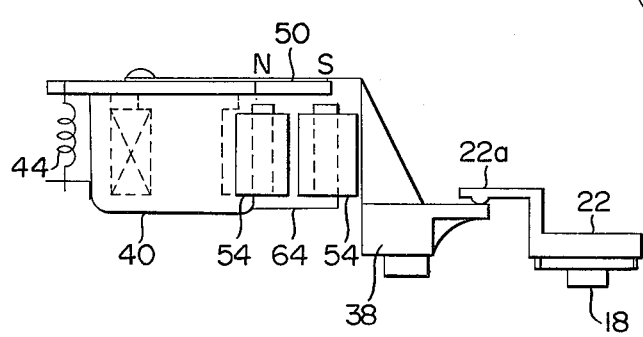
FIG. 5A is a front view of a modified embodiment of the speed sensor for the head loading devices shown in FIGS. 3A and 4B.
Figure 5C:
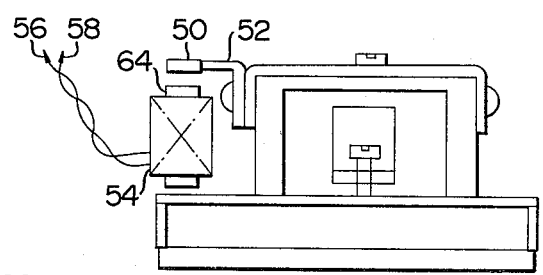
FIG. 5C is a side elevational view of the arrangement shown in FIGS. 5A and 5B.

FIGS. 5A, 5B and 5C show a modification of the speed sensor shown in FIGS. 3A and 3B or FIGS. 4A and 4B. In the arrangement illustrated, the speed sensor 60 includes a U-shaped iron core 64 and a pair of solenoids 54 disposed around both legs of the "U" respectively. The pair of solenoids 54 are interconnected and arranged so that they are not affected by a leakage magnetic field from the electromagnet 40 disposed adjacent to the solenoids 54. Therefore the magnetic shield 62 is omitted.

Also the permanent magnet 50 is connected to the spring loaded armature for the electromagnet 40 and is located above the legs of the "U" or a pair of magnetic pole pieces of the electromagnet 40.

Further, the two solenoids 54 are electrically interconnected so that, when the permanent magnet is moved toward or away from the iron core 64, the pair of the solenoids 54 induce respective electromotive forces which supplement each other.

Therefore the arrangement shown in FIGS. 5A, 5B and 5C can induce an electromotive force higher than that induced in the arrangement illustrated in FIGS. 3A and 3B or 4A or 4B.

From the foregoing it is seen that the present invention is able to control the speed at which a magnetic record medium is loaded with the associated magnetic heads or at which the magnetic heads are unloaded from the magnetic record medium. The speed is controlled to have to a stable and optimum magnitude by using principally an electronic circuit without employing a mechanical component such as a damper and a head loading electromagnet of a special structure.

While the present invention has been illustrated and described in conjunction with a few preferred embodiments thereof, it is to be understood that numerous changes and modification may be resorted to without departing from the spirit and scope of the present invention. For example, while the present invention has been described in conjunction with an electromagnet for loading a particular magnetic recording medium with an associated magnetic head or heads and for unloading the magnetic head or heads from the magnetic recording medium, it is to be understood that the present invention is not restricted thereto or thereby and that the present invention is equally applicable to loading and unloading magnets having a so-called plunger structure in which an associated magnetic pole piece is moved within a mate winding or mechanisms by which the motion of a rotating structure is transformed to a movement of the bail plate toward or away from an associated magnetic recording medium by means of a cam or the like. Also, the present invention has been described in conjunction with the speed sensor utilizing an electromagnetically induced electromotive force but it is to be understood that the present invention is not restricted to the structure of the speed sensor per se. For example, the present invention is equally applicable to a speed sensor means for sensing a relative position of a bail plate by a combination of a semiconductor luminescent diode and a phototransistor and electrically differentiating the sensed position to determine a speed.

What we claim is:

1. A magnetic head soft loading and unloading device for use with an interchangeable two-sided magnetic recording medium comprising: a carriage movable along both sides of said magnetic recording medium; a pair of magnetic heads disposed on said carriage; a turnable first arm, at least one of said pair of magnetic heads being disposed on said first arm; said first arm being turnable to move said at least one of said pair of heads toward said magnetic recording medium to load said magnetic recording medium with said at least one of said pair of magnetic heads and moving said at least one of said pair of magnetic heads away from said magnetic recording medium to unload said at least one of said pair of magnetic heads from said magnetic recording medium; driving means, including an electromagnetic device for turning said first arm when said magnetic recording medium is loaded with said at least one of said pair of magnetic heads and when said at least one of said pair of magnetic heads is unloaded from said magnetic recording medium, said electromagnet device including an armature, a return spring operatively coupled to said armature for biasing said at least one of said pair of magnetic heads away from said magnetic recording medium, and an exciting winding disposed around said electromagnet device; a speed sensor for sensing a speed of movement of said first arm and producing a first signal indicative of said speed of movement; and a driving circuit means, responsive to said first signal, for controlling current flow through said exciting winding so as to control a speed at which said electromagnet device as energized by said current turns said first arm and thereby controls a speed at which said at least one of said pair of magnetic heads is moved toward or away from said magnetic recording medium.

2. A magnetic head soft loading and unloading device as in claim 1 further comprising: a turnable second arm, said pair of magnetic heads being carried by respective ones of said first and second arms and at least one of said first and second arms being provided with a lifting arm, said lifting arm engaging a movable portion of said electromagnet device.

3. A magnetic head soft loading and unloading device as in claim 1 wherein said electromagnetic device has a movable portion, said speed sensor including a permanent magnet disposed on said movable portion and a solenoid electromagnetically coupled to said permanent magnet to generate an electromotive force dependent upon a speed of movement of said movable portion.

4. A magnetic head soft loading and unloading device as in claim 3 wherein said solenoid is magnetically shielded from a leakage magnetic field resulting from said electromagnet device or any magnet other than said permanent magnet.

5. A magnetic head soft loading and unloading device as in claim 4 further comprising: an iron core, a gap being defined between said iron core and said permanent magnet, said solenoid being disposed around said iron core and generating an electromotive force dependent upon a rate at which the size of said gap changes.

6. A magnetic head soft loading and unloading device as in claim 5 wherein said iron core is in the form of a "U" and said solenoid includes a pair of windings disposed around both legs of the "U".

7. A magnetic head soft loading and unloading device as in claim 1 further comprising: means for generating a second signal indicative of whether said at least one of said pair of magnetic heads is to be loaded onto or unloaded from said magnetic recording medium, and said driving circuit for said exciting winding includes a differential amplifier having a first pair of inputs, and one of said first pair of inputs being coupled to a speed sensor for receiving said first signal, the other one of said first pair of inputs being coupled to said second signal generating means so as to receive said second signal so that said differential amplifier produces a first difference signal indicative of the difference in magnitude between said first and second signals to change said current flowing through said exciting winding in accordance with said first difference signal.

8. A magnetic head soft loading and unloading device as in claim 7 further comprising: a negative feedback circuit connected to the other one of said first pair of inputs of said differential amplifier and to the output side of said exciting winding.

9. A magnetic head soft loading and unloading device as in claim 1 further comprising: means for generating a second signal indicative of whether said at least one of said pair of magnetic heads is to be loaded onto or unloaded from said magnetic recording medium, and said driving circuit for said exciting winding includes means for amplifying said first signal to produce an amplified signal and a comparison circuit having a second pair of inputs, said amplified signal being applied to one of said second pair of inputs, said second signal being applied to the other of said second pair of inputs so that said comparison circuit produces a second difference signal indicative of the difference in magnitude between said amplified and second signals to change said current flowing through said exciting windings in accordance with said second difference signal.

10. A magnetic head soft loading and unloading device as in claim 9 further comprising: a negative feedback circuit connected to the other one of said second pair of inputs to said comparison circuit and to the output side of said exciting winding.

11. A magnetic head soft loading and unloading device as in claim 1 wherein said magnetic record medium is in the form of a double-sided flexible disc cartridge.

* * * * *